United States Patent
Giovanni

(10) Patent No.: US 7,796,597 B2
(45) Date of Patent: Sep. 14, 2010

(54) AUTO CONFIGURATION OF STATIC RENDEZVOUS POINTS USING BOOTSTRAP ROUTER PROTOCOL MESSAGES FROM PIM SM

(75) Inventor: Heather Giovanni, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

(21) Appl. No.: 11/582,923

(22) Filed: Oct. 17, 2006

(65) Prior Publication Data
US 2008/0089332 A1   Apr. 17, 2008

(51) Int. Cl.
*H04L 12/28* (2006.01)
*H04L 12/56* (2006.01)

(52) U.S. Cl. .................. 370/390; 710/316; 710/317

(58) Field of Classification Search ............ 370/216, 370/312, 351, 390; 455/427
See application file for complete search history.

(56) References Cited

U.S. PATENT DOCUMENTS

| 6,631,420 | B1 | 10/2003 | Li et al. | |
|---|---|---|---|---|
| 6,791,980 | B1* | 9/2004 | Li | 370/390 |
| 2004/0132448 | A1* | 7/2004 | Torres et al. | 455/427 |
| 2005/0220074 | A1* | 10/2005 | Kawamura et al. | 370/351 |
| 2006/0018253 | A1* | 1/2006 | Windisch et al. | 370/216 |
| 2006/0182049 | A1* | 8/2006 | Rokui | 370/312 |

* cited by examiner

*Primary Examiner*—Dang T Ton
*Assistant Examiner*—Lionel Preval

(57) ABSTRACT

A process for configuring rendezvous points in switch routers of a PIM-SM network that includes static rendezvous point configuration and bootstrap router protocol messaging. A user will input static rendezvous point commands into one of the routers in the network that identifies the rendezvous points for all of the group ranges in the network. The rendezvous commands will include instructions for the router to transmit the static rendezvous point configuration to the other routers using BSR protocol messages, where the messages are designated as special BSR messages.

14 Claims, 2 Drawing Sheets

AUTO CONFIGURATION OF STATIC RENDEZVOUS POINTS USING BOOTSTRAP ROUTER PROTOCOL MESSAGES FROM PIM SM

BACKGROUND

A network is a collection of devices, such as servers, work stations, telephones, PDAs, etc., that communicate with other either through hard-wires or wirelessly. In a switched network, a plurality of switch routers allows many nodes or hosts to be efficiently interconnected where blocks of data, referred to as packets or messages, can be transmitted from a source in the network to a host. A plurality of networks can be interconnected to form an internet.

Some networks employ a multicast protocol where a single message or packet can be sent to a particular IP address, and copies of the message are then delivered from IP address to a plurality of hosts that are part of a specified group, where a range of IP addresses identities the group. The hosts may join or be removed from a particular group at any time without talking to other member hosts in the group. One type of multicast routing protocol is known as protocol independent multicast (PIM), well known to those skilled in the art, that is able to build on any unicast routing protocol and allow a relatively small number of routers to receive network traffic for a particular group. PIM is typically separated into dense mode (DM) and sparse mode (SM). In PIM-DM most of the hosts in the system want to receive all of the multicast messages. In PIM-SM, generally only small groups of hosts want to receive any particular multicast message. In a PIM-SM network, the routers may use a bootstrap router (BSR) protocol, well known to those skilled in the art, to distribute rendezvous point information within the PIM-SM domain. The PIM-SM does the multicast routing, and may include unicast routes created by open shortest path first (OSPF) protocol, routing information protocol (RIP), static routes or other unicast routing protocols.

In PIM-SM, routers are able to join and leave multicast groups using PIM messages. A source, such as a server, may send a PIM multicast message to a group of hosts, such as a group of work stations. In order for the PIM-SM to work properly, it needs to use rendezvous points (RP). A rendezvous point is an IP address in a router that receives messages transmitted between a source and a group of hosts for a specified group range. The PIM assigns a rendezvous point at one of the switch routers for each group where the multicast message is sent for the group. Particularly, each multicast message transmitted from the source will be destined for a multicast group address that is included in a multicast group range that is represented by a single rendezvous point. Thus, for each defined group address in the network, a rendezvous point will be provided. In this type of network, each host is not interested in knowing the location of the source, but is only interested in knowing the rendezvous point for its group. Likewise, the source is only interested in sending the multicast message to the rendezvous point for the group from where it is disseminated to the group.

It is necessary that all of the routers in the network know which routers are the rendezvous point for which group. There are two known techniques for configuring rendezvous points in the switch routers for PIM-SM. One known technique is referred to as a static rendezvous point configuration. Static rendezvous point configuration requires the user to input rendezvous point commands using a router interface, such as a management console, into each router that identifies the rendezvous points for each group of work stations.

Alternatively, the BSR protocol can be used to configure the rendezvous points at the routers. In this technique, the user will input commands into one of the routers that identifies the groups, identifies which routers can be candidate rendezvous points and which routers can be a candidate BSR. The PIM defines a set of procedures by which all of the routers in the network can agree on which routers are rendezvous points for which group. The BSR will go through an election process based on predetermined BSR criteria to determine which of the routers will be an elected BSR. Once the BSR determines which router is the elected BSR router, the elected BSR will then determine which router is the rendezvous point for which groups.

There are disadvantages to both the static rendezvous point configuration and the BSR protocol rendezvous point configuration. Particularly, the static rendezvous point configuration requires each separate router to be manually configured with the rendezvous points for the groups, i.e., the rendezvous points are input to each router using PIM-SM commands. Thus, each switch router must be programmed with the static rendezvous point configuration for all of the routers, which is somewhat time consuming and cumbersome.

Configuring the rendezvous points in the switch routers using the BSR protocol requires a higher level of complexity that includes an election process, a BSR candidacy process, and an RP selection process that requires a significant period of time for the messages to be distributed to the switch routers to allow the switch router to learn which routers are the rendezvous points for which groups. Further, the BSR protocol rendezvous point configuration has the potential for misconfiguration and incomplete configuration. Also, the candidate rendezvous point information can change or time out during the BSR protocol rendezvous point configuration process.

DETAILED DESCRIPTION OF THE EMBODIMENTS

Figure 1:
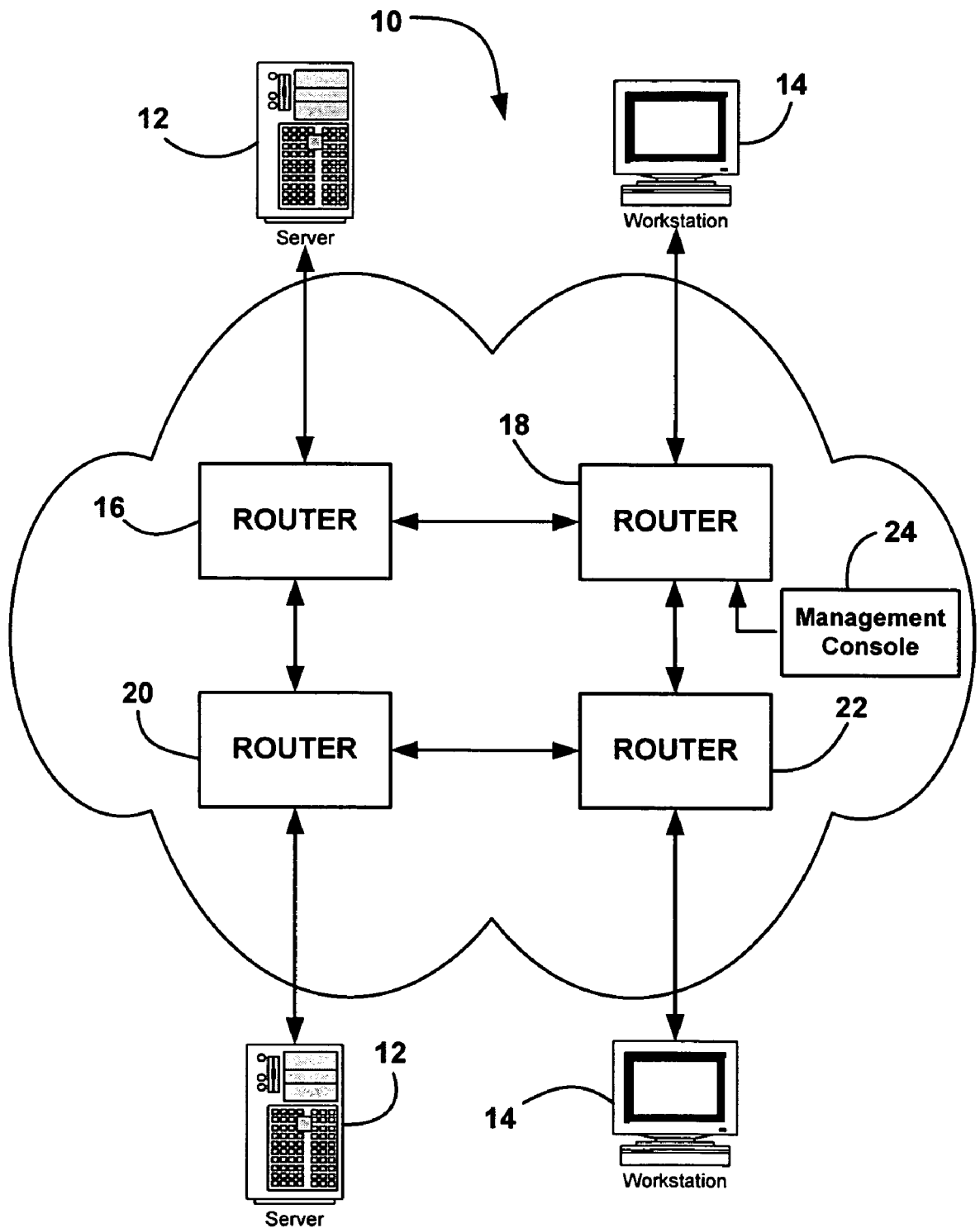
FIG. 1 is a block diagram of a network employing a process for configuring rendezvous points for a plurality of routers.

FIG. 1 is a general block diagram of a switched network 10 including servers 12 and work stations 14 interconnected by switch routers 16, 18, 20 and 22. Files are transferred back and forth between the servers 12 and the stations 14. A particular station 14 may request a file from the server 12. The server 12 will send the file to the station 14 through the switch routers 16, 18, 20 and 22 using an internet protocol (IP) address to identify the station 14. A management console 24 can be used to input commands to the router 18. All of the routers 16-22 could have their own management console, or a single management console could be used for all of the routers 16-22.

The discussion below describes a method for automatically configuring rendezvous points for PIM-SM network routers using static rendezvous point configuration and bootstrap router protocol messaging. Particularly, a user will input commands identifying a static rendezvous point configuration for all of the routers into one of the routers 16, 18, 20 and 22. In on embodiment, the user can use the management console 24 to the input commands for the static rendezvous point configuration into the router 18 and a command for the router 18 to forward a BSR message including the rendezvous point configuration to the other routers 16, 20 and 22 using the BSR protocol. Particularly, the router 18 may set a particular flag in a BSR message to indicate that it is a special static configuration for the rendezvous points for the other routes 16, 20 and 22. The BSR message can be sent at any suitable time, such as system start-up or boot. Because all PIM-SM routers are capable of processing BSR messages, programming the messages to include the flag identifying a static rendezvous point configuration would be relatively straightforward to those skilled in the art.

The user could use the management console 24 to configure a static rendezvous point configuration with a group range using suitable programming commands. The user could then opt to propagate this information at configuration time. The router the user was using would then create and send out a special BSR message. This message would have a flag set to indicate that it is different from other BSR messages so that it would get processed and passed to all the other routers in the network as is normal functionality for a BSR protocol. Each router receiving the special BSR message would then configure the static rendezvous points into its memory and possibly send the message on to other routers in the system. The rendezvous point configuration process of the invention has the advantage of simplicity and ease of use provided by static rendezvous configuration without the drawbacks provided by dynamic bootstrap rendezvous point configuration.

Figure 2:
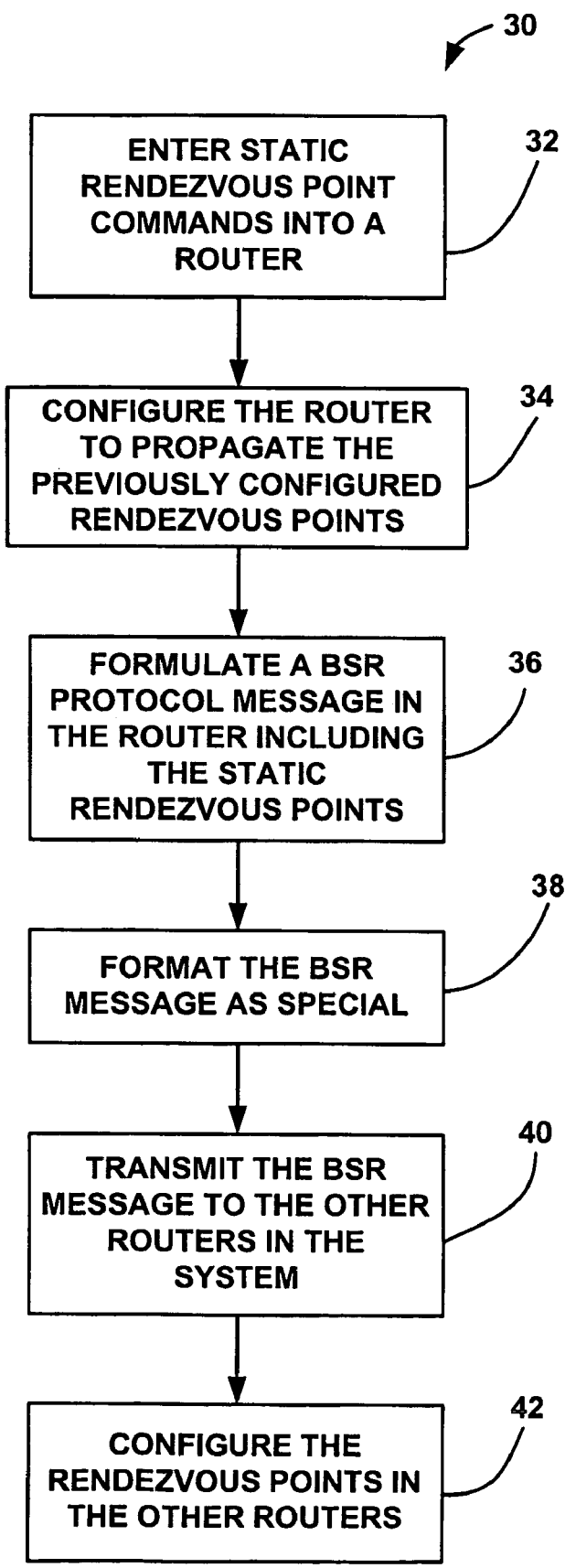
FIG. 2 is a flow chart diagram showing the process for configuring rendezvous points for a plurality of routers.

FIG. 2 is a flow chart diagram 30 showing a process for configuring rendezvous points at the routers in a PIM-SM network. The process includes entering the predetermined static rendezvous points using PIM-SM commands into one of the routers at box 32. The user can use any suitable user management device for entering the commands, such as the management console 24. The commands include instructions for causing the router to transmit the rendezvous points to the other routers in the system using the BSR protocol. The user would define the multicast group ranges in the network, and define which router is the rendezvous point for each group range. The multicast address that the source is sending data to determines the rendezvous point.

The BSR protocol then configures the router to propagate the rendezvous points that were previously configured in the router at box 34. The BSR protocol then formulates a BSR message in the router that includes the static rendezvous points entered into the router at box 36. The BSR protocol formats the BSR message as special, such as by setting a suitable control flag, at box 38 so that the other routers that receive the message will know that it is a message to configure the static rendezvous points. The BSR protocol then transmits the message to the other routers in the system at box 40. The other routers then configure the rendezvous points into their memory at box 42, and possibly transmit the BSR message on to other routers in the network system.

The foregoing discussion discloses and describes merely exemplary embodiments. One skilled in the art will readily recognize from such discussion, and from the accompanying drawings and claims, that various changes, modifications or variations can be made therein without departing from the spirit and scope of the embodiments as defined in the following claims.

What is claimed is:

1. A method for configuring rendezvous points at a plurality of routers in a network, said method comprising:
  entering rendezvous point commands into one of the routers, said rendezvous point commands identifying, for each of a plurality of multicast group ranges, which router is the rendezvous point for the multicast group range in the network;
  formulating a message in the one router that receives the rendezvous point commands, wherein the message identifies, for each of the plurality of multicast group ranges, which router is the rendezvous point for the multicast group range in the network as indicated by the entered rendezvous point commands;
  marking the message as special, wherein the marking indicates the message includes a static configuration of which routers are rendezvous points for the multicast group ranges;
  transmitting the message to the other routers in the network; and
  configuring the rendezvous points in the other routers.

2. The method according to claim 1 wherein the network runs a protocol independent multicast.

3. The method according to claim 2 wherein the network runs a protocol independent multicast sparse mode protocol.

4. The method according to claim 1 wherein marking the message as special includes setting a flag in the message.

5. The method according to claim 1 wherein formulating a message includes formulating a bootstrap router protocol message.

6. The method according to claim 1 further comprising configuring the rendezvous points in the one router before formulating the message.

7. The method according to claim 1 wherein entering the rendezvous point commands includes using a management console.

8. A method for configuring rendezvous points at a plurality of routers in a network, said network using a protocol independent multicast sparse mode (PIM-SM) protocol, said method comprising:
  using a management console for entering rendezvous point commands into one of the routers, said rendezvous point commands, for each of a plurality of multicast group ranges, which router is the rendezvous point for the multicast group range in the network;
  formulating a bootstrap router (BSR) protocol message in the one router that receives the rendezvous point commands, wherein the message identifies, for each of the plurality of multicast group ranges, which router is the rendezvous point for the multicast group range in the network as indicated by the entered rendezvous point commands;
  marking the BSR message as special by setting a predetermined flag in the BSR message, wherein the marking indicates the message includes a static configuration of which routers are rendezvous points for the multicast group ranges;
  transmitting the BSR message to the other routers in the network; and
  configuring the rendezvous points in the other routers.

9. The method according to claim 8 further comprising configuring the rendezvous points in the one router before formulating the message.

10. A network comprising:
  at least one multicast group range;
  a plurality of network routers in communication with each other; and
  a router interface device for inputting rendezvous point commands into one of the routers, said rendezvous point commands instructing the one router, for each of a plurality of multicast group ranges, which router is the rendezvous point for the multicast group range in the network, wherein the router interface is a management console, said rendezvous point commands further instructing the one router to formulate a message to be transmitted to the other routers in the network identifying, for each of the plurality of multicast group ranges, which router is the rendezvous point for the multicast group range in the network as indicated by the entered rendezvous point commands wherein the message is identified as special by setting a flag in the message.

11. The network according to claim 10 wherein the network runs a protocol independent multicast.

12. The network according to claim 11 wherein the system runs a protocol independent multicast sparse mode protocol.

13. The network according to claim 10 wherein the message is formulated as a bootstrap router protocol message.

14. The network according to claim 10 wherein the one router configures stores the rendezvous points in the one router before formulating the message.

\* \* \* \* \*

UNITED STATES PATENT AND TRADEMARK OFFICE
CERTIFICATE OF CORRECTION

| | | |
|---|---|---|
| PATENT NO. | : 7,796,597 B2 | Page 1 of 1 |
| APPLICATION NO. | : 11/582923 | |
| DATED | : September 14, 2010 | |
| INVENTOR(S) | : Giovanni | |

It is certified that error appears in the above-identified patent and that said Letters Patent is hereby corrected as shown below:

Column 6, line 8, claim 14, after "router" delete "configures".

Signed and Sealed this
Eighth Day of November, 2011

David J. Kappos
*Director of the United States Patent and Trademark Office*